US011934231B2

United States Patent
Dunbar et al.

(10) Patent No.: US 11,934,231 B2
(45) Date of Patent: Mar. 19, 2024

(54) PROTECTIVE HOUSING FOR A MOBILE DEVICE

(71) Applicant: Hand Held Products, Inc., Charlotte, NC (US)

(72) Inventors: Blake Edmund Dunbar, Philadelphia, PA (US); Dwight Linwood Franz, Haddonfield, NJ (US); Ralph Chen, Bothell, WA (US); Yang Zhang, Hatfield, PA (US); Robert Pierce, West Berlin, NJ (US); Mark Tentler, Matthews, NC (US); Sean Philip Kearney, Marlton, NJ (US); Mark Howe, Central City, IA (US); Kevin Sharpe, Morris Plains, NJ (US); Paul Morris, Central City, IA (US); Doyle Davis, Everett, WA (US)

(73) Assignee: Hand Held Products, Inc., Charlotte, NC (US)

( * ) Notice: Subject to any disclaimer, the term of this patent is extended or adjusted under 35 U.S.C. 154(b) by 10 days.

(21) Appl. No.: 17/450,772

(22) Filed: Oct. 13, 2021

(65) Prior Publication Data

US 2022/0035413 A1 Feb. 3, 2022

Related U.S. Application Data

(63) Continuation of application No. 16/534,099, filed on Aug. 7, 2019, now Pat. No. 11,169,572.

(51) Int. Cl.
*G06F 1/16* (2006.01)
*H04B 1/3888* (2015.01)
(Continued)

(52) U.S. Cl.
CPC .......... *G06F 1/1656* (2013.01); *G06F 1/1626* (2013.01); *H04B 1/3888* (2013.01);
(Continued)

(58) Field of Classification Search
CPC ................. G06F 1/1656; G06F 1/1626; G06F 2200/1633; H04B 1/3888; H04M 1/185;
(Continued)

(56) References Cited

U.S. PATENT DOCUMENTS 3,136,850 A 6/1964 Blaker
3,651,257 A 3/1972 Goetz, Jr.
(Continued)

FOREIGN PATENT DOCUMENTS

CN 106707580 A 5/2017
KR 20-0258154 Y1 12/2001

OTHER PUBLICATIONS

Examiner Interview Summary Record (PTOL-413) dated Jul. 9, 2021 for U.S. Appl. No. 16/534,099.
(Continued)

*Primary Examiner* — Imani N Hayman
*Assistant Examiner* — Theron S Milliser
(74) *Attorney, Agent, or Firm* — Alston & Bird LLP

(57) ABSTRACT

A housing of a device comprises a screw boss that extends outwardly from a first base plate proximate to a corner of the housing. Additionally, the housing of the device includes a force dissipation member. The force dissipation member includes a central portion that is sized to detachably attach around the screw boss. The force dissipation member further includes at least two arms that extend outwardly from the central portion, wherein each arm of the at least two arms is attached to a different side of the two walls of the housing.

20 Claims, 8 Drawing Sheets

(51) Int. Cl.
*H04M 1/18* (2006.01)
*A45C 11/00* (2006.01)
*A45C 13/00* (2006.01)

(52) U.S. Cl.
CPC ....... *H04M 1/185* (2013.01); *A45C 2011/002* (2013.01); *A45C 13/002* (2013.01); *G06F 2200/1633* (2013.01)

(58) Field of Classification Search
CPC .. A45C 13/002; A45C 2011/002; A45C 11/00
See application file for complete search history.

(56) References Cited

U.S. PATENT DOCUMENTS

| | | | |
|---|---|---|---|
| 4,089,464 A * | 5/1978 | Teti, Jr. | H05K 5/023 |
| | | | 294/142 |
| 4,360,838 A | 11/1982 | Babicz et al. | |
| 5,124,855 A | 6/1992 | Dew et al. | |
| 5,161,239 A | 11/1992 | Hodulik et al. | |
| 5,202,768 A * | 4/1993 | Oboza | H04N 5/645 |
| | | | 348/823 |
| 5,289,348 A | 2/1994 | Miller | |
| 5,595,430 A | 1/1997 | Weyeneth | |
| 5,737,304 A | 4/1998 | Soga et al. | |
| 6,196,516 B1 | 3/2001 | Lan | |
| 6,392,982 B1 * | 5/2002 | Kobayashi | G11B 33/121 |
| | | | 360/99.15 |
| 6,426,935 B1 | 7/2002 | Imai et al. | |
| 6,487,039 B1 | 11/2002 | Bernett | |
| 6,560,119 B1 | 5/2003 | Katsuyama et al. | |
| 7,059,182 B1 | 6/2006 | Ragner | |
| 7,471,509 B1 | 12/2008 | Oliver | |
| 8,300,352 B1 | 10/2012 | Larson et al. | |
| 9,763,343 B2 | 9/2017 | Kim et al. | |
| 9,798,361 B2 | 10/2017 | Kim | |
| 9,910,493 B2 | 3/2018 | Vander et al. | |
| 10,019,043 B2 | 7/2018 | Eguchi et al. | |
| 10,117,345 B2 * | 10/2018 | Yamamoto | H05K 5/03 |
| 10,158,744 B2 * | 12/2018 | Suzuki | G06F 1/1628 |
| 11,009,914 B2 * | 5/2021 | Chen | G06F 1/1616 |
| 11,228,334 B2 * | 1/2022 | Huang | A45C 11/00 |
| 11,237,597 B2 * | 2/2022 | Yamamoto | H04M 1/0249 |
| 2005/0000996 A1 | 1/2005 | Petravic | |
| 2006/0158775 A1 | 7/2006 | Sega et al. | |
| 2010/0165556 A1 | 7/2010 | Sonehara et al. | |
| 2011/0001280 A1 | 1/2011 | Huang | |
| 2011/0247172 A1 | 10/2011 | Yoshii et al. | |
| 2012/0193496 A1 | 8/2012 | Li | |
| 2013/0242486 A1 | 9/2013 | Okano | |
| 2015/0034221 A1 | 2/2015 | Broly | |
| 2015/0108030 A1 | 4/2015 | Yin | |
| 2015/0331456 A1 | 11/2015 | Moon | |
| 2018/0054903 A1 * | 2/2018 | Yamamoto | H05K 5/0008 |
| 2018/0063302 A1 * | 3/2018 | Suzuki | H04M 1/0202 |
| 2020/0225709 A1 * | 7/2020 | Chen | H05K 5/0217 |
| 2020/0343925 A1 * | 10/2020 | Huang | A45C 11/00 |
| 2021/0089087 A1 * | 3/2021 | Yamamoto | G06F 1/1626 |

OTHER PUBLICATIONS

Final Rejection dated Jan. 4, 2021 for U.S. Appl. No. 16/534,099.
Non-Final Rejection dated Aug. 19, 2020 for U.S. Appl. No. 16/534,099.
Non-Final Rejection dated Mar. 29, 2021 for U.S. Appl. No. 16/534,099.
Notice of Allowance received for U.S. Appl. No. 16/534,099, dated Jul. 9, 2021, 15 pages.

* cited by examiner

PROTECTIVE HOUSING FOR A MOBILE DEVICE

CROSS-REFERENCE TO RELATED APPLICATIONS

This application is a continuation of U.S. patent application Ser. No. 16/534,099, filed Aug. 7, 2019, titled "A Protective Housing For A Mobile Device," the contents of each of which is incorporated by reference herein in their entirety.

TECHNOLOGICAL FIELD

Exemplary embodiments of the present disclosure relate generally to a protective housing and, more particularly, to a protective housing configured to dissipate a force.

BACKGROUND

A typical device, for example, an electronic device is usually enclosed within a housing. The housing may be designed to protect various components of the electronic device from external particulates and external forces (that may damage the electronic device). For example, the housing may protect the components from external forces that may act upon the housing of the electronic device in an instance in which the electronic device is accidentally dropped.

Applicant has identified a number of deficiencies and problems associated with conventional a protective housing for mobile device. Through applied effort, ingenuity, and innovation, many of these identified problems have been solved by developing solutions that are included in embodiments of the present disclosure, many examples of which are described in detail herein.

BRIEF SUMMARY

Various embodiments illustrated herein disclose a housing for a device comprising a screw boss that extends out from a first base plate of the housing and is proximate to a corner of the housing. Further, the housing includes a force dissipation member that includes a central portion sized to detachably attach around the screw boss. The force dissipation member further comprises at least two arms that extend outwardly from the central portion, wherein each arm of the at least two arms is attachable to different walls of two walls defining the corner. The force dissipation member is configured to dissipate a force that is received at the corner along the at least two arms and to the two walls of the housing.

Various embodiments illustrated herein disclose a device comprising a housing. The housing includes a first base plate. Further, the housing includes a corner defined by two walls, wherein the two walls extend outwardly from the first base plate. Additionally, the housing includes a screw boss that is proximate to the corner and extends outwardly from the first base plate in a same direction as the two walls. Furthermore, the housing includes a force dissipation member that includes a central portion disposable around the screw boss. The force dissipation member further includes at least two arms that extend outwardly from the central portion, wherein each arm of the at least two arms is attached to a different side of the two walls of the housing. The force dissipation member is configured to dissipate a force that is received at the corner along the at least two arms and to the two walls of the housing.

Various embodiments illustrated herein disclose a force dissipation member comprising a central portion. further, the force dissipation member includes at least two arms extending outwardly from the central portion. The central portion of the force dissipation member is receivable around a screw boss of a housing. The at least two arms are configured to be attached to two walls of the housing. The force dissipation member is configured to dissipate a force that is received at the central portion of the force dissipation member along the at least two arms and to the two walls of the housing.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
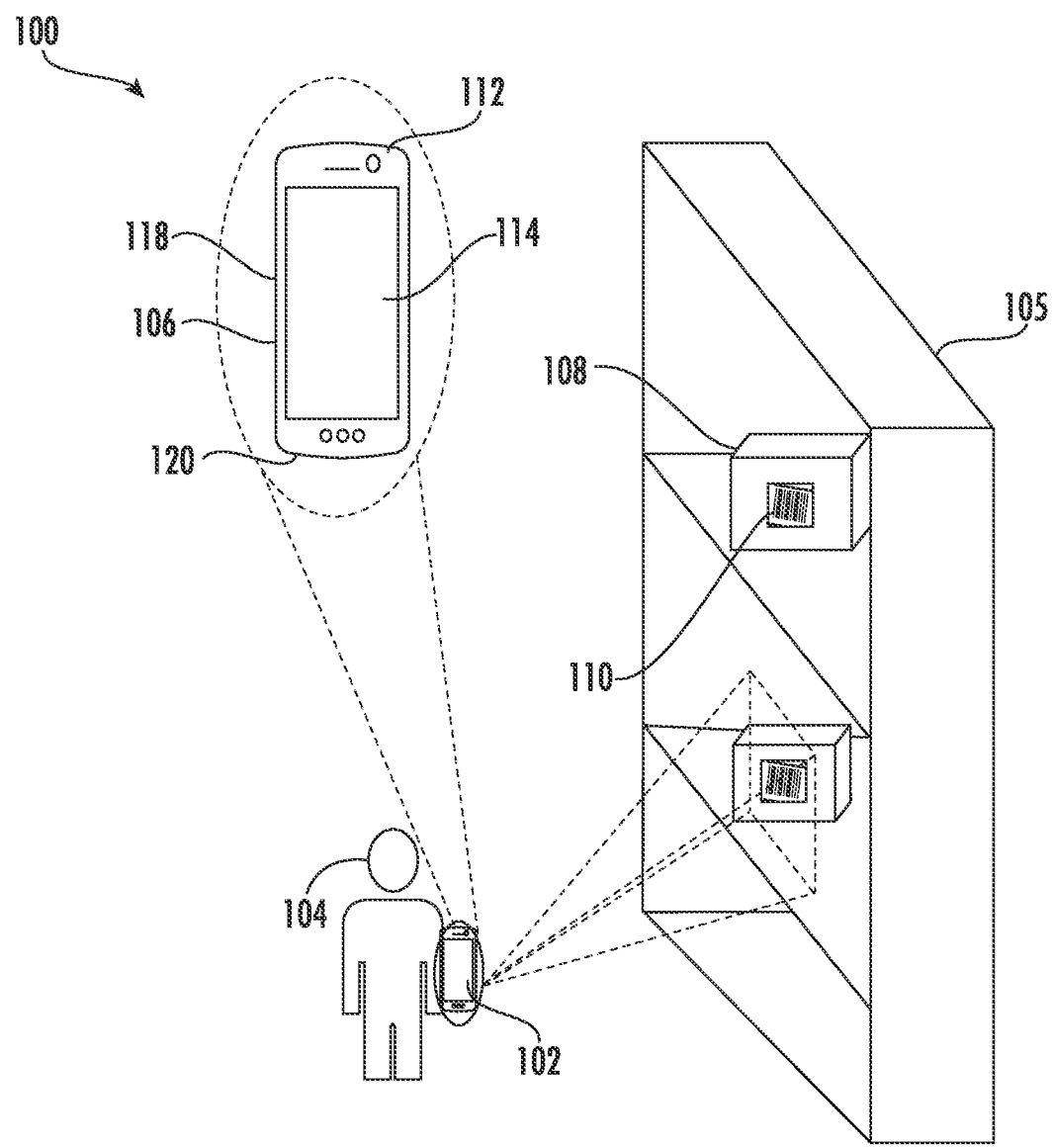
FIG. 1 illustrates an exemplary environment where a device may be used, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

It is commonly understood that devices (e.g., a mobile device, a barcode scanner, an imager, a dimensioner, a handle for mobile computers, and/or the like) can be and frequently are dropped resulting, in some examples, in damage to the device. In some examples, particular types of dropping events may result in more damage than others, for instance when a device is dropped and it lands on one of the corners of the device.

In some examples, an impact with respect to one of the corners can be more damaging than an impact with respect to another portion (e.g., the walls of the housing) of the device. Such an impact is potentially more damaging given that the surface area of the corner is much less in comparison to the other portions of the housing. Accordingly force per unit area (applied by the external force) is greater in the corners of the housing in comparison to the other portions of the housing (e.g., walls of the housing). Therefore, the external force acting on the corners of the housing may have greater potential of damaging the housing in comparison to an instance when an external force acts on the walls of the housing. Moreover, in some examples, such external forces (e.g., an external force that is acting on the corners of the housing) may create dents in the housing, which may, in some examples, cause damage to components enclosed within the housing.

The apparatuses described herein are therefore configured to rely on force dissipation members within the housing to dissipate external forces that may act on a device that is placed within the housing in an instance in which the device is accidentally or intentionally dropped. In some examples, these force dissipation members may be positioned proximate to the corners of the housing to dissipate the external force acting on the corners of the housing. For example, the force dissipation members may dissipate the external force acting on the corners of the housing by dissipating the force through the force dissipation members and to the walls of the housing. Accordingly, in some examples, the damage to housing is advantageously reduced or otherwise avoided when the device lands on a corner.

Specifically, in some example embodiments, the apparatuses described herein correspond to a housing or casing of a device (e.g., a mobile device, a barcode scanner, an imager, a dimensioner, and/or the like). The housing may include a first base plate on which various components of the device may be mounted in a defined configuration. The housing may further include a plurality of walls that extend outwardly from the first base plate of the housing. In some examples, the plurality of walls may extend outwardly from the edges of the first base plate. Further, the plurality of walls may extend outwardly from the first base plate in a first direction so as to form a structure that is configured to receive a device therein. In an example embodiment, the plurality of walls of the housing define a plurality of corners of the housing. In some examples, a corner of the housing may be defined as a region where two walls of the plurality of walls of the housing meet.

The housing further includes a screw boss that extends outwardly from the first base plate of the housing in the same direction as the plurality of walls and is located proximal to, but spaced apart from, a corner of the housing. In some examples, the screw boss may be defined within the housing and may be attached to the corner of the housing through one or more ribs. In other example embodiments, the screw boss may be molded as part of the housing and/or may be attached or otherwise coupled to the housing.

In an example embodiment, the first base plate, the plurality of walls, the screw boss and the one or more ribs may be molded as a single structure, whereas in other example embodiments they may be molded or otherwise attached together. For example, in some examples, the first base plate and the plurality of walls are molded together as a single structure. Whereas, in alternative embodiments, the screw boss and the one or more ribs are molded separately and, may, be attached to the first base plate using adhesives or other coupling means such as welding and/or the like.

In an example embodiment, the one or more ribs may correspond to features that extend outwardly from the screw boss in a direction towards the plurality of walls such that the one or more ribs may attach the screw boss with a wall of the two walls proximate to the screw boss.

Further, the housing may include one or more wall latches that extend inwardly from the two walls of the plurality of walls. The one or more wall latches are located proximal to the screw boss and are spaced apart from the one or more ribs. In some examples, the one or more wall latches are molded together with the different walls of the two walls. Alternatively or additionally, the one or more wall latches may be molded separately and may be attached to different walls of the two walls during assembly of the device using adhesives or other coupling means such as welding and/or the like.

In some examples, the screw boss is configured to receive a force dissipation member. In an example embodiment, the force dissipation member includes a central portion and at least two arms that extend outwardly from the central portion. In some examples, the at least two arms are attached to the central portion in such a manner that the at least two arms and the central portion together generally form an arc. The central portion of the force dissipation member is configured to be disposed around the screw boss. Further, the at least two arms are fixedly attached to the one or more wall latches on the two walls.

In an example scenario and when the device falls on the corner and the external force acts on the corner, the external force is transferred to the force dissipation member through the one or more ribs. Thereafter, the force dissipation member may redirect the force to the two walls (that define the corner) of the housing through the at least two arms of the force dissipation member. Accordingly, the damage to the device due to external forces (generated when the device is accidentally dropped) is reduced.

FIG. 1 illustrates an exemplary environment 100 where a device 102 may be used, according to one or more embodiments described herein. The exemplary environment 100 may include the device 102, a user 104, rack 105 and one or more objects 108 placed on the rack 105.

The device 102 may include one or more components, circuitry, software modules, and/or the like that may enable the device 102 to perform a predetermined operation in the exemplary environment 100. For example, the user 104 may utilize the device 102 to scan the one or more objects 108 to obtain information pertaining to the one or more objects 108. In an example embodiment, the device 102 may include an image capturing device 112 that may enable the device 102 to capture an image of a barcode 110 on the one or more objects 108 and accordingly, obtain the information pertaining to the one or more objects 108 by decoding the barcode 110. Further, the device 102 may include a communication module (not shown) that may enable the device 102 to transmit the information pertaining to the one or more objects 108 to a remote computer. Furthermore, the device 102 may include a display screen 114 that may display a user interface (UI) to the user 104. The user 104 may control the operation of the device 102 based on inputs provided through the UI displayed on the display screen 114. Further, the display screen 114 may be configured to display the information pertaining to the one or more objects 108.

In some examples, the scope of the disclosure is not limited to the device 102 comprising the image capturing device 112, the communication module, and the display screen 114. In an example embodiment, the device 102 may include other electronic and mechanical components that enable the device 102 to perform other operations, without departing from the scope of the disclosure.

In an example embodiment, the device 102 has a housing 106 that may be configured to partially or fully enclose the device 102. For example, the housing 106 may be configured to partially or fully enclose the communication module, the display screen 114, and the image capturing device 112. In an example embodiment, the housing 106 may include a first cover 118 and a second cover 120. The first cover 118 may be attached to the second cover 120 through one or more coupling members such as, but are not limited to, screws, nuts, bolts, adhesive, and/or the like, to form the housing 106. In some examples, the housing 106 may formed of a single contiguous cover, without departing from the scope of the disclosure. The structure of the housing 106 is further described in conjunction with FIGS. 2-7.

Figure 2:
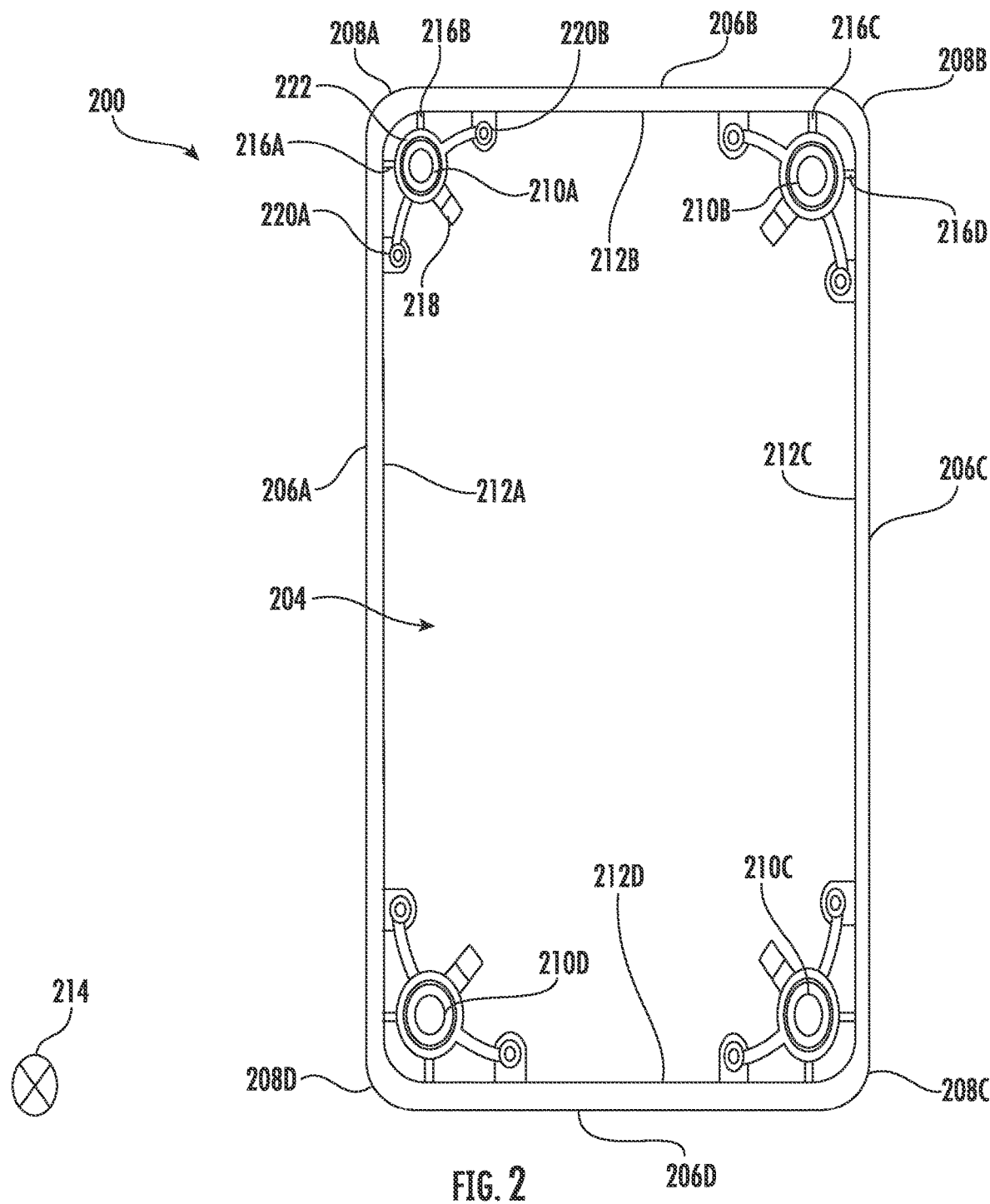
FIG. 2 illustrates a top view of a first cover of a housing, according to one or more embodiments described herein.

FIG. 2 illustrates a top view 200 of a first cover 118 of the housing 106, according to one or more embodiments described herein. In an example embodiment, the first cover 118 may include a first base plate 204, a plurality of walls 206a, 206b, 206c, and 206d, a plurality of corners 208a, 208b, 208c, and 208d, and plurality of screw bosses 210a, 210b, 210c, and 210d.

The first base plate 204 may correspond to a plastic plate, a metal plate, or combination thereof, on which the one or more components of the device 102 may be mounted. In some examples, the first base plate 204 may have a plurality of edges 212a, 212b, 212c, and 212d. From each edge (e.g., edge 212a) of the plurality of edges 212a, 212b, 212c, and 212d, a wall (e.g., 206a) may extend outwardly in a first direction (depicted by 214). In some examples, the plurality of walls 206a, 206b, 206c, and 206d may be molded together with the first base plate 204. In an alternate embodiment, the plurality of walls 206a, 206b, 206c, and 206d may be molded separately from the first base plate 204, and may be attached to the first base plate 204. For example, the plurality of walls 206a, 206b, 206c, and 206d may be attached to the first base plate 204 using adhesives or other coupling means such as welding, and/or the like. In some examples, the plurality of walls 206a, 206b, 206c, and 206d are configured to extend outwardly from the first base plate 204 so as to surround and/or otherwise retain a device, such as device 102.

In an example embodiment, two walls (e.g., the wall 206a and the wall 206b) of the plurality of walls 206a, 206b, 206c, and 206d may define a corner (e.g., 208a) of the plurality of corners 208a, 208b, 208c, and 208d of the housing 106. In some examples, the corner (e.g., corner 208a) of the housing 106 may be defined as a region where the two walls (e.g., the wall 206a and the wall 206b) of the plurality of walls 206a, 206b, 206c, and 206d meet with each other. For example, the wall 206a and the wall 206b meet to define the corner 208a. Similarly, the wall 206b and the wall 206c meet to define the corner 208b.

Proximate to each corner of the plurality of corners 208a 208b, 208c, and 208d, a screw boss of the plurality of screw bosses 210a, 210b, 210c, and 210d may extend outwardly from the first base plate 204 in a same direction as that of the plurality of walls 206a, 206b, 206c, and 206d (i.e., along the first direction depicted by 214). For example, the screw boss 210a may extend outwardly from the first base plate 204 proximate to but separated from the corner 208a.

In some examples, the screw boss 210a may be molded together with the first cover 118 such that the screw boss 210a may extend from the first base plate 204 proximate to, but spaced apart, from the corner 208a. In an alternate embodiment, the screw boss 210a may be molded separately from the first cover 118 and may be attached to the first cover 118. For example, the screw boss 210a may be attached to the first base plate 204 using adhesives or other coupling means such as welding, and/or the like. The structure of the screw boss 210a is further described in conjunction with FIG. 4.

For purpose of ongoing description, the structure of the first cover 118, proximate to the corner 208a, is described. However, it may be understood by those skilled in the art that the structure of the first cover 118 proximate to other corners (208b, 208c, and 208d) of the housing 106, is same as the structure of the first cover 118 proximate to the corner 208a.

In an example embodiment, the first cover 118 may further define one or more ribs 216a and 216b, and a supporting member 218. The one or more ribs 216a and 216b, and the supporting member 218 may extend outwardly from the screw boss 210a in a direction towards the two walls (e.g., the wall 206a and the wall 206b) of the plurality of walls 206a, 206b, 206c, and 206d. In some examples, the one or more ribs 216a and 216b may additionally or alternatively extend out from the screw boss 210a such that the one or more ribs 216a and 216b may attach to the screw boss 210a and the different walls of the two walls (e.g., the wall 206a and the wall 206b) that define the corner 208a.

Further, the rib 216a may be orthogonal to the rib 216b. In an example embodiment, the two walls (e.g., the wall 206a and the wall 206b), the screw boss 210a and the one or more ribs 216a and 216b are molded together. In an alternate embodiment, the one or more ribs 216a and 216b may be molded as separate components and may be attached to the screw boss and the different walls of the two walls (e.g., the wall 206a and the wall 206b) using adhesives or other coupling means such as welding, and/or the like.

Similar to the one or more ribs 216a and 216b, the first cover 118 may define additional ribs proximate to other corners (e.g., the corner 208b, 208c, and 208d) of the housing 106. For example, the rib 216c and the rib 216d may extend outwardly from the screw boss 210b in a direction towards two walls 206b and 206c, respectively. In some examples, the scope of the disclosure is not limited to having two ribs (as is illustrated in FIG. 2). In an example embodiment, more than two ribs may extend out from the first base plate 204 to attach to the screw boss 210a and to the two walls 206a and 206b.

Figure 3:
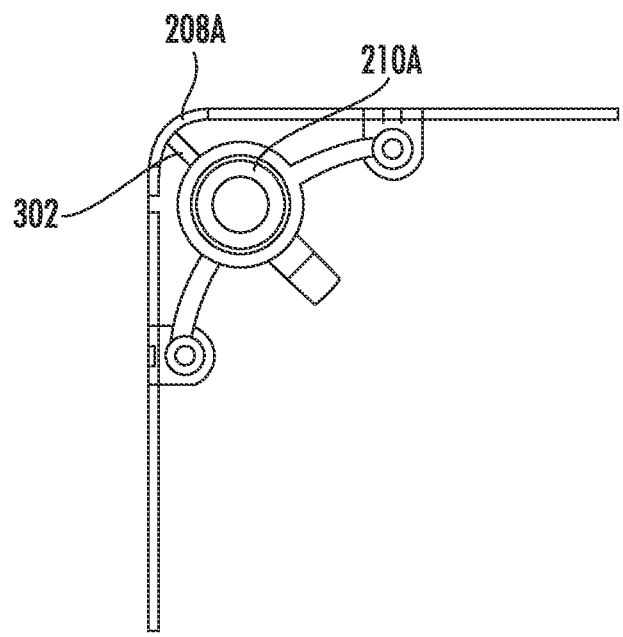
FIG. 3 illustrates a top view of a portion of the first cover, according to one or more embodiments described herein.

Further, in some examples, the scope of the disclosure is not limited to one or more ribs 216a and 216b that extend out from the screw boss 210a to attach the screw boss 210a to the different walls of the two walls (e.g., the wall 206a and the wall 206b). In an alternate embodiment, the one or more ribs 216a and 216b may extend out from the screw boss 210a to attach the screw boss 210a with the corner 208a. One such arrangement is illustrated in FIG. 3. FIG. 3 illustrates a top view of a portion of the first cover 118 depicting a single rib 302 that is attached to the screw boss 210a and to the corner 208a.

Referring back to FIG. 2, the supporting member 218 may extend out from the screw boss 210a in a direction towards diagonally opposite corner 208c. In some examples, the supporting member 218 may be further attached to the first base plate 204. In an example embodiment, an angle between the supporting member 218 and a rib (e.g., the rib 216a) of the one or more ribs 216a and 216b may be 135 degrees. In some examples, the supporting member 218 may be configured to provide structural support to the screw boss 210a. For example, the supporting member 218 does not allow the screw boss 210a to bend or succumb to a force (that may act on the screw boss 210a) during assembly of the device 102 or while operating the device 102.

In an example embodiment, the supporting member 218 may be molded together with the first cover 118 and the screw boss 210a. In an alternate embodiment, the supporting member 218 may be molded as a separate component and may be attached to the screw boss 210a and the first base plate 204 using adhesives or any other known coupling techniques such as welding, and/or the like.

In an example embodiment, the first cover 118 further includes one or more wall latches 220a and 220b that may extend outwardly the different walls of the two walls (e.g., the wall 206a and the wall 206b) in a direction perpendicular to the two walls (e.g., the wall 206a and the wall 206b). For example, the wall latch 220a may extend outwardly from the wall 206a in the direction perpendicular to the wall 206a and towards the wall 206c opposite to the wall 206a. In some examples, the one or more wall latches 220a and 220b are molded together with the first cover 118 such that the two walls (e.g., the wall 206a and the wall 206b) are molded together with the one or more wall latches 220a and 220b. The structure of the one or more wall latches 220a and 220b is further described in conjunction with FIG. 4. In an alternate embodiment, the one or more wall latches 220a and 220b may be molded as separate component and may be attached to the two walls (e.g., the wall 206a and the wall 206b) using adhesives or any other known coupling techniques such as welding, and/or the like. The structure one or more wall latches 220a and 220b, as a separate component, is described later in FIGS. 5A and 5B.

Figure 4:
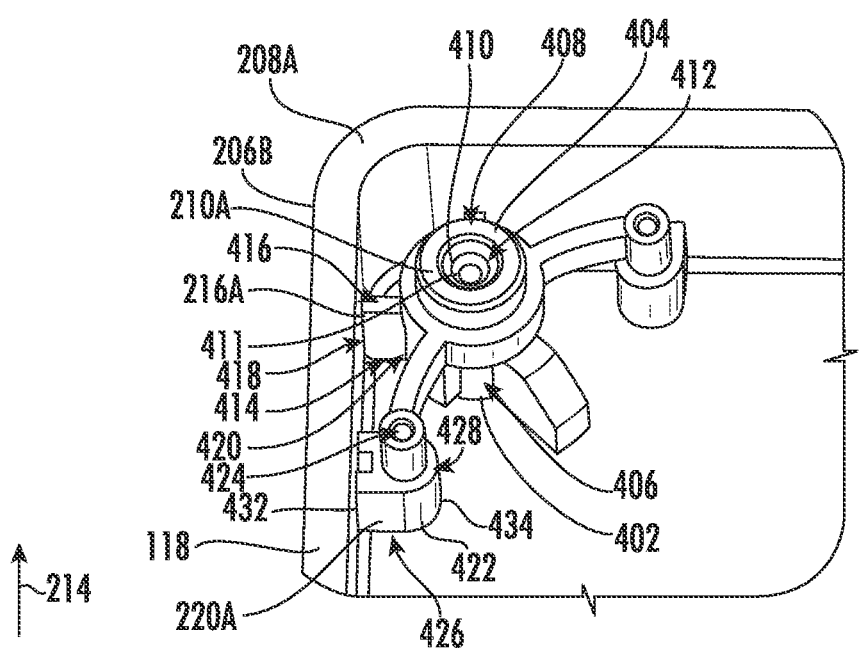
FIG. 4 illustrates a perspective view of the portion of the first cover, according to one or more embodiments described herein.

FIG. 4 illustrates a perspective view of the portion of the first cover 118 depicting the corner 208a, according to one or more embodiments described herein. As illustrated in FIG. 4, the screw boss 210a may have a cylindrical shape and have a first end 402, a second end 404, an outer surface 406, a top surface 408 located at the second end 404, and an inner surface 410. The screw boss 210a may extend between the first end 402 and the second end 404 such that the first end 402 is attached with the first base plate 204 of the first cover 118, and the second end 404 of the screw boss 210a is distal from the first base plate 204.

In some example embodiments, the second end 404 of the screw boss 210a has the top surface 408 and an inner surface 410. In an example embodiment, the top surface 408 of the screw boss 210a defines an opening 409 to a recess 412. The recess 412 is further defined by the inner surface 410 and extends from the second end 404 of the screw boss 210a through the screw boss 210a and to the first end 402 of the screw boss 210a. In alternate embodiment, the recess 412 may extend to a location proximal to the first end 402 of the screw boss 210a.

In some examples, the inner surface 410 of the screw boss 210a may define helical ramps 411 angled at a defined pitch. In an example embodiment, the helical ramps 411 may protrude outwardly from the inner surface 410 of the screw boss 210a. In an alternate embodiment, the helical ramps 411 may extend inwardly from the inner surface 410 of the screw boss 210a. In an example embodiment, the helical ramps 411 may be configured to allow a screw, having complementary ramps to that of the helical ramps 411, to be received in the screw boss 210a.

In an example embodiment, rib 216a may have a first end 414, a second end 416, a third end 418, and a fourth end 420. As discussed, the rib 216a may extend out from the outer surface 406 of the screw boss 210a such that a junction between the rib 216a and the screw boss 210a defines the third end 418 of the rib 216a. As discussed above, the rib 216a is attached to the wall 206a. In an example embodiment, a junction between the rib 216a and the wall 206a defines the fourth end 420 of the rib 216a. Further, as discussed, the rib 216a is coupled to the first base plate 204. In some examples, a junction between the rib 216a and the first base plate 204 defines the first end 414 of the rib 216a. In some examples, the second end 416 is distal from the first base plate 204.

In an example embodiment, a height of the rib 216a may be less than a height of the screw boss 210a. In an example embodiment, the structure of the rib 216b (not illustrated in FIG. 4) may be similar to that of rib 216a. Further, the height of the rib 216b may be same as the height of the rib 216a.

In an example embodiment, the wall latch 220a has a base portion 422 and a rod portion 424. The base portion 422 of the wall latch 220a extends from a first end 426 of the wall latch 220a to an intermediate end 428. In some examples, the first end 426 of the wall latch 220 may be molded as part of or otherwise attached to the first base plate 204. In an example embodiment, the base portion 422 of the wall latch 220a further has a third end 432 and a fourth end 434. In an example embodiment, the third end 432 of the base portion 422 may be molded as part of or otherwise attached to the wall 206b, while the fourth end 434 of the base portion 422 is distal from the wall 206b. In some examples, a height of the base portion 422 is same as the height of the one or more ribs 216a and 216b.

In an example embodiment, the rod portion 424 of the wall latch 220a extends outwardly from the intermediate end 428 along the first direction, depicted by 214. The rod portion 424 may be positioned proximal to the fourth end 434 of the base portion 422, and distal from the third end 432 of the base portion 422.

In some examples, the scope of the disclosure is not limited to the one or more wall latches 220a and 220b being molded as part of the housing 106. In an alternative embodiment, as discussed above, the one or more wall latches 220a and 220b may be separate components that may be attached to the housing 106 using adhesives or other coupling means such as welding, and/or the like. The wall latch is further described in FIG. 5A and FIG. 5B.

Figure 5A:
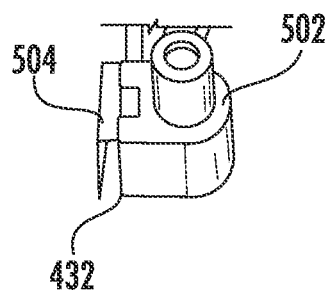
FIG. 5A illustrates a perspective view of a modular wall latch, according to one or more embodiments described herein.

FIG. 5A illustrates a perspective view of modular wall latch 502, according to one or more embodiments described herein. In an example embodiment, the modular wall latch 502 has a structure that is similar to the wall latch 220a, except that the third end 432 of the modular wall latch 502 is attached to a U-shaped coupler 504. In some examples, the U-shaped coupler 504 may be configured to slidingly engage with a protrusion on a wall (e.g., the wall 206a) of the housing 106. In some examples, the U-shaped coupler 504 may be configured to be slidingly received on the wall (e.g., the wall 206a) directly. For example, the U-shaped coupler 504 may be received along the width of the wall 206a.

Figure 5B:
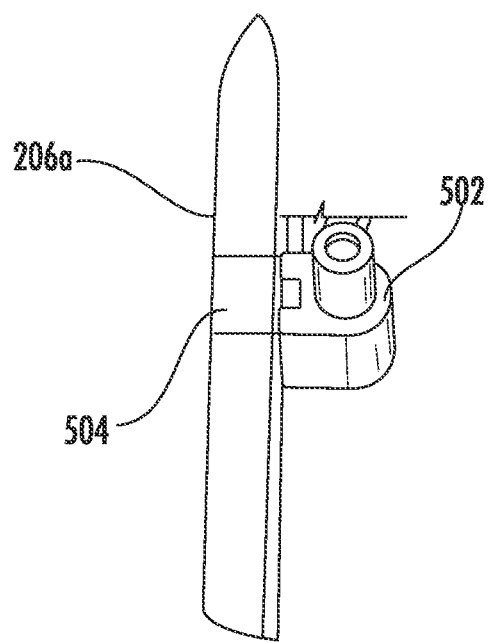
FIG. 5B illustrates a perspective view of a wall of the housing having received the modular wall latch, according to one or more embodiments described herein.

FIG. 5B illustrates a portion of the housing 106 depicting the modular wall latch 502 attached to the wall 206a, according to one or more embodiments described herein. Referring to FIG. 5B, the wall 206a has a width that enables sliding engagement with the U-shaped coupler 504 (defined at the third end 432 of the modular wall latch 502), thereby coupling the modular wall latch 502 to the housing 106.

In some examples, the U-shaped coupler has been depicted for illustrative purposes. In an example embodiment, the modular wall latch 502 may be attached to the wall 206a using other means such as adhesive, welding, or any other type of coupling mechanism, without departing from the scope of the disclosure.

Referring back to FIG. 2, each screw boss of the plurality of screw bosses 210a, 210b, 210c, and 210d may be configured to receive a force dissipation member 222. The force dissipation member 222 is a component that may be configured to dissipate force either through other components in the device 102, or by converting the force into other forms of energy. For example, the force dissipation member 222 may convert force into electrical energy. In such a scenario, the force dissipation member 222 may include an electromagnet or a piezoelectric material that may facilitate conversion of the force into electrical energy. In some examples, the force dissipation member 222 may be positioned in the housing 106 of the device 102. In another example, the force dissipation member 222 may be positioned external to the housing 106 of the device 102, as is further described in conjunction with FIGS. 9-11. An example of the force dissipation member 222 may include, but is not limited to, a leaf spring. The structure of the force dissipation member 222 is further described in conjunction with FIG. 6A and FIG. 6B.

Figure 6A:
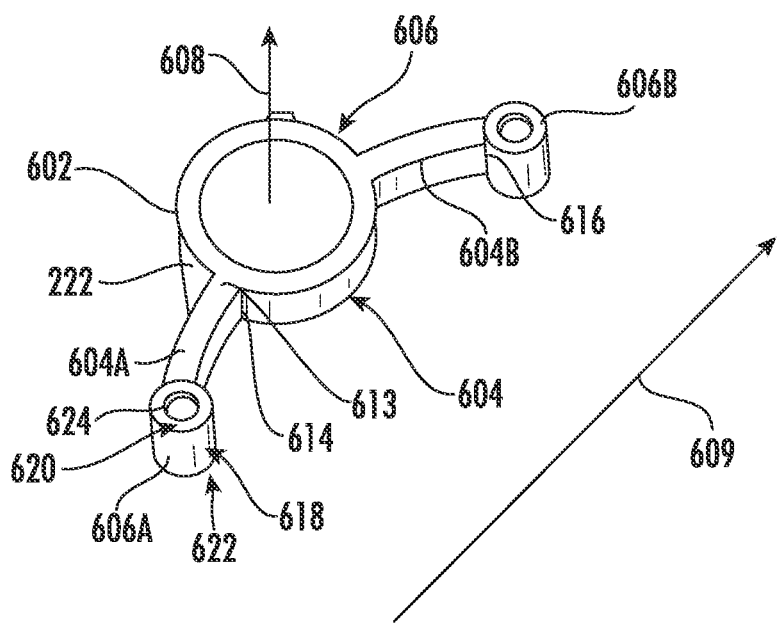
FIG. 6A illustrates a perspective view a force dissipation member, according to one or more embodiments described herein.
Figure 6B:
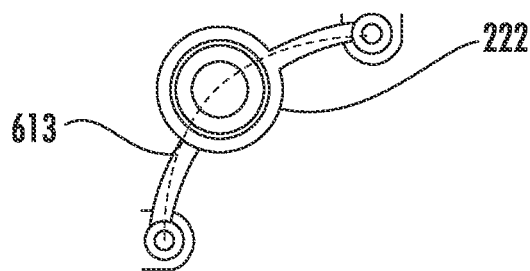
FIG. 6B illustrates a top view of the force dissipation member, according to one or more embodiments described herein.

FIG. 6A and FIG. 6B illustrate a perspective view and a top view of the force dissipation member 222, respectively, according to one or more embodiments described herein. In an example embodiment, the force dissipation member 222 includes a central portion 602, at least two arms 604a and 604b, and at least two wall latch portions 606a, and 606b.

Referring to FIG. 6A, the force dissipation member 222 defines a central portion 602 in shape of an annular ring. In some examples, the central portion 602 has an outer surface 608 and an inner surface 610. Further, the central portion 602 has a first end portion 612 and a second end portion 614. The first end portion 612 and the second end portion 614 are spaced apart from each other along an axis 616. In an example embodiment, the axis 616 may correspond to a central axis of the force dissipation member 222 that passes through a center of the central portion 602 and is perpendicular to a longitudinal axis 617 of the force dissipation member 222.

In some examples, the at least two arms 604a and 604b may extend outwardly from the outer surface 608 such that the central portion 602 and the at least two arms 604a and 604b forms an arc 613, such as is shown in FIG. 6B. In an example embodiment, each arm of the at least two arms 604a and 604b has a first end 621 and a second end 623. The first end 621 of the at least two arms 604a and 604b may be molded as part of or otherwise attached to the outer surface 608 of the central portion 602. The second end 623 of the at least two arms 604a and 604b is may be molded as part of or otherwise attached to the at least two wall latch portions 606a, and 606b, respectively.

In an example embodiment, the at least two wall latch portions 606a, and 606b have similar structures. In an example embodiment, the force dissipation member 222 define the wall latch portion 606a in a shape of an annular ring at the second end 623 of the arms 604a. The wall latch portion 606a has an outer surface 618 and an inner surface 620. Further the wall latch portion 606a has a first end 622 and a second end 624. The first end 622 of the wall latch portion 606a is spaced apart from the second end 624 of the wall latch portion 606a along the axis 608. In some examples, the first end 622 of the wall latch portion 606a and the first end portion 604 of the central portion 602 are coplanar.

Referring back to FIG. 2, in an example embodiment, the force dissipation member 222 is configured to be received on the screw boss 210a such that the central portion 602 of force dissipation member 222 is received around the screw boss 210a. In some examples, the inner surface 612 of the central portion 602 of the force dissipation member 222 abuts the outer surface 406 of the screw boss 210a. Further, the first end portion 604 of the central portion 602 abuts the supporting member 218, and the one or more ribs 216a and 216b.

In an example embodiment, the at least two wall latch portions 606a and 606b are received around the rod portion 424 of the at least two wall latches 220a and 220b, respectively. Accordingly, the at least two wall latch portions 606a and 606b are attached to the different walls of the two walls (i.e., the wall 206a and the wall 206b) through the two wall latches 220a and 220b, respectively. Since the height of the two wall latches 220a and 220b, the one or more ribs 216a and 216b, and the supporting member 218 is same, therefore, the first end portion 604 of the central portion 602 and the first end 622 of the at least two wall latch portions 606a and 606b are coplanar, when the force dissipation member 222 is received by the first cover 118 of the housing 106.

In an example embodiment, the force dissipation member 222 may be detachably attached to the screw boss 210a or may be fixedly attached on the screw boss 210a, without departing from the scope of the disclosure. In an example scenario, where the force dissipation member 222 is fixedly on the screw boss 210a, the force dissipation member 222 may be attached to the screw boss 210a through adhesives or other coupling means such as welding. Similarly, the at least two wall latch portions 606a and 606b may be fixedly or detachably attached to the two wall latches 220a and 220b, respectively.

In some examples, the scope of the disclosure is not limited to the two wall latch portions 606a and 606b (on the force dissipation member 222) attached to different walls of the two walls (i.e., the wall 206a and the wall 206b) through the at least two wall latches 220a and 220b. In an alternate embodiment, the two wall latch portions 606a and 606b may be directly attached to the different walls of the two walls (i.e., the wall 206a and the wall 206b). In such a scenario, the two wall latch portions 606a and 606b may be molded together with the two walls (i.e., the wall 206a and the wall 206b).

Figure 7:
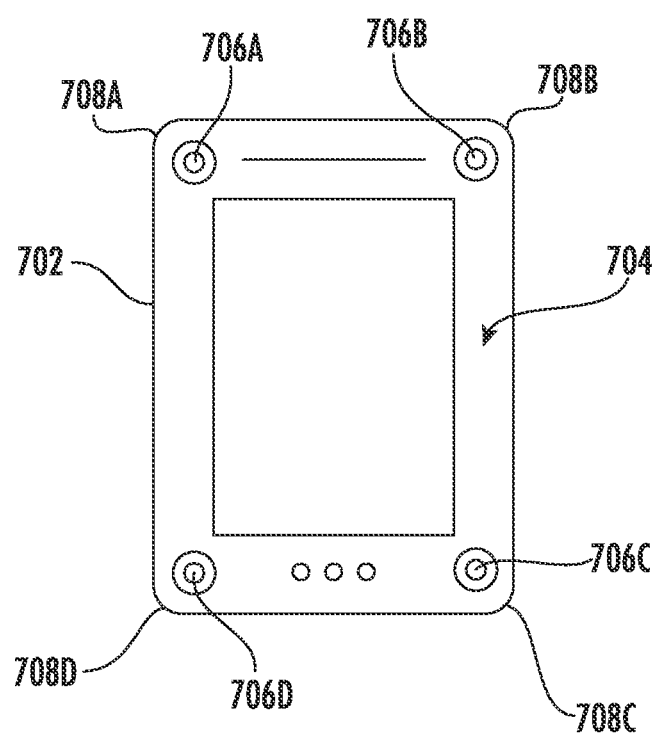
FIG. 7 illustrates a top view of a second cover of a housing, according to one or more embodiments described herein.

FIG. 7 illustrates a top view of the second cover 120 of the housing 106, according to one or more embodiments described herein. The second cover 120 includes a second base plate 702 that has a first surface 704. The first surface 704 defines a plurality of through holes 706a, 706b, 706c, and 706d proximate to a plurality of corners 708a, 708b, 708c, and 708d of the second cover 120. In some examples, the second cover 120 is configured to be disposed on top of the first cover 118 such that the plurality of through holes 706a, 706b, 706c, and 706d align with the plurality of screw bosses 210a, 210b, 210c, and 210d, respectively. More particularly, the plurality of through holes 706a, 706b, 706c, and 706d may align with the recess 412 of each of the plurality of screw bosses 210a, 210b, 210c, and 210d. In some examples, further, the recess 412 of each of the plurality of screw bosses 210a, 210b, 210c, and 210d is configured to receive screws (not shown) that pass through the plurality of through holes 706a, 706b, 706c, and 706d, respectively, to couple the first cover 118 with the second cover 120.

In some examples, the scope of the disclosure is not limited to the housing 106 comprising the first cover 118 and the second cover 120. In an example embodiment, the housing 106 may be composed of a single contiguous cover, without departing from the scope of the disclosure. In some examples, such cover may be manufactured using various known molding and 3D printing techniques.

Figure 8:
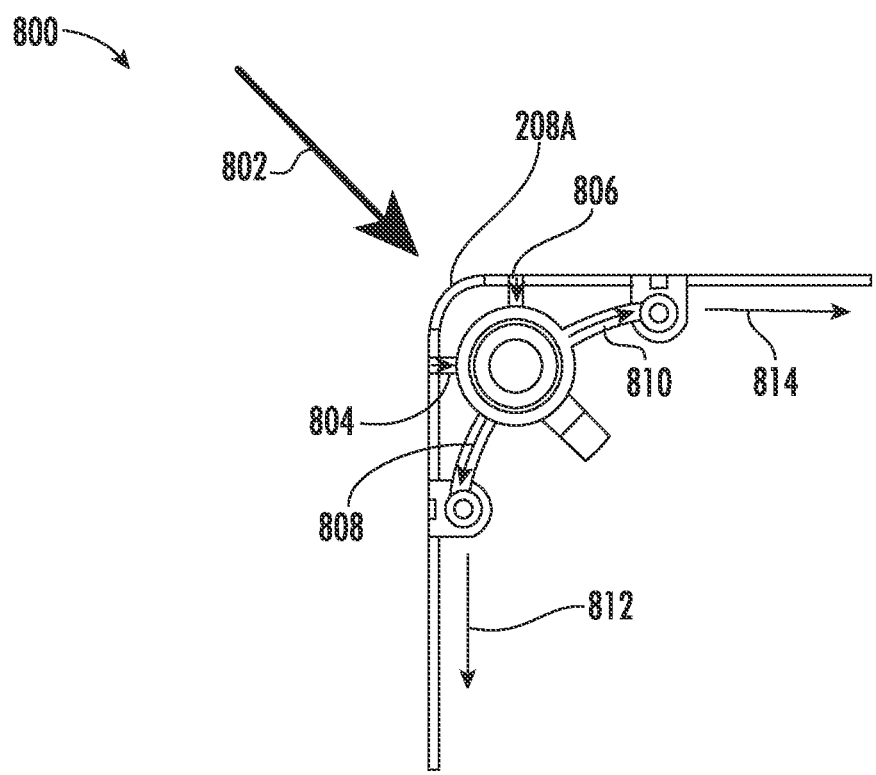
FIG. 8 illustrates an exemplary scenario depicting a dissipation of force in the housing, according to one or more embodiments described herein.

FIG. 8 illustrates an exemplary scenario 800 depicting dissipation of force in the housing 106, according to one or more embodiments described herein. In an example embodiment, when the force (depicted by arrow 802) acts on the corner 208a (e.g., because of accidental dropping of the device 102), the force is transferred to the force dissipation member 222 through the one or more ribs 216a and 216b (depicted by arrows 804 and 806). More particularly, the force is transferred to the central portion 602 of the force dissipation member 222. Thereafter, the force gets distributed to the at least two wall latch portions 606a and 606b through the at least two arms 604a and 604b, respectively (depicted by arrows 808 and 810). Since the at least two wall latch portions 606a and 606b are attached to the different walls of the two walls (e.g., the wall 206a and the wall 206b) through the one or more wall latches 220a and 220b, the force is dissipated along the two walls (e.g., the wall 206a and the wall 206b) and away from the corner (depicted by arrows 812 and 814).

In some examples, the scope of the disclosure is not limited to the force dissipation member 222 being positioned in the housing 106 of the device 102. In an example embodiment, the force dissipation member 222 may be installed in a casing apparatus for the device 102, as is further described in FIG. 9.

Figure 9:
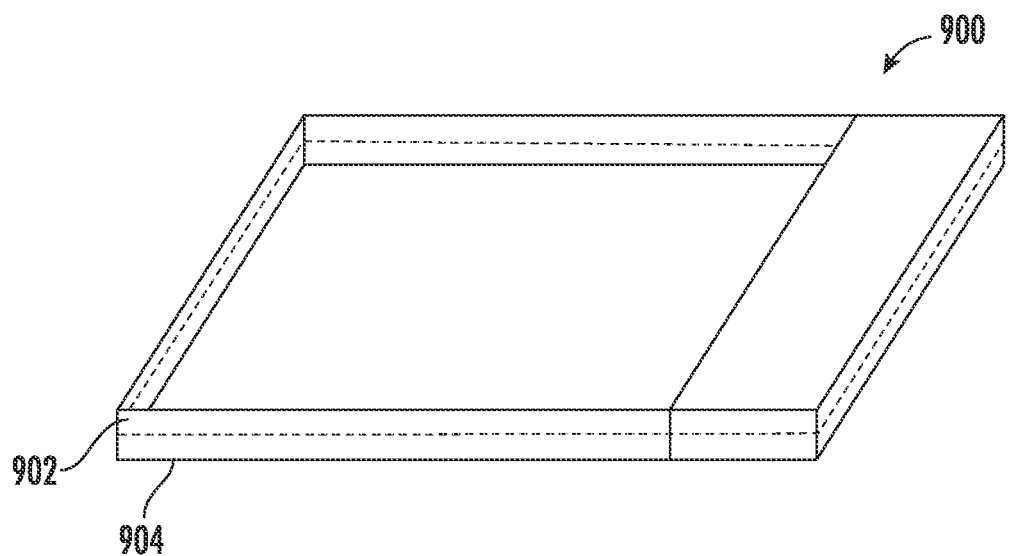
FIG. 9 illustrates a perspective of a casing apparatus for the device, according to one or more embodiments described herein.

FIG. 9 illustrates a perspective of a casing apparatus 900 for the device 102, according to one or more embodiments described herein. The casing apparatus 900 includes a third cover 902 and a fourth cover 904. In an example embodiment, the structure of the third cover 902 may be similar to the first cover 118 of the device 102. An example structure of the third cover 902 is further described in conjunction with FIG. 10. Further, an example structure of the fourth cover 904 is further described in conjunction with FIG. 11.

Figure 10:
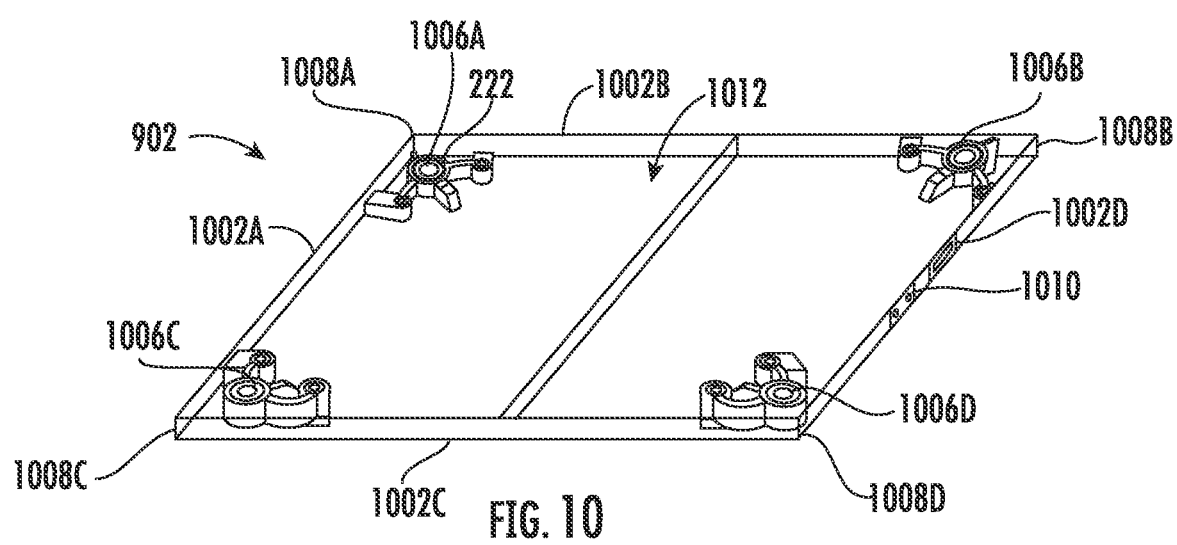
FIG. 10 illustrates a perspective of a third cover of the casing apparatus, according to one or more embodiments described herein.

FIG. 10 illustrates a perspective of the third cover 902 of the casing apparatus 900, according to one or more embodiments described herein. In an example embodiment, similar to the first cover 118, the third cover 902 defines the plurality of screw bosses 1006a, 1006b, 1006c, and 1006d at plurality of corners 1008a, 1008b, 1008c, and 1008d of the third cover 902. Further, similar to the first cover 118, the plurality of corners 1008a, 1008b, 1008c, and 1008d are defined by a plurality of walls 1002a, 1002b, 1002c, and 1002d of the third cover 902 of the casing apparatus 900.

In an example embodiment, each screw boss (e.g., 1006a) of the plurality of screw bosses 1006a, 1006b, 1006c, and 1006d is configured to receive the force dissipation member 222. Additionally, the third cover 1002 defines a depression 1012 for receiving the device 102, itself. Further, the third cover 1002 may receive additional mechanical/electrical components that may interface with the device 102 to enhance the capabilities of the device 102, in an instance in which the device 102 is received in the casing apparatus 900. For example, the third cover 1002 may include another image capturing device 1010 that may be capable of scanning an indicium. When the device 102 is received in the casing apparatus 900, the device 102 may interface with the other image capturing device 1010 to, for example, scan the indicium.

Figure 11:
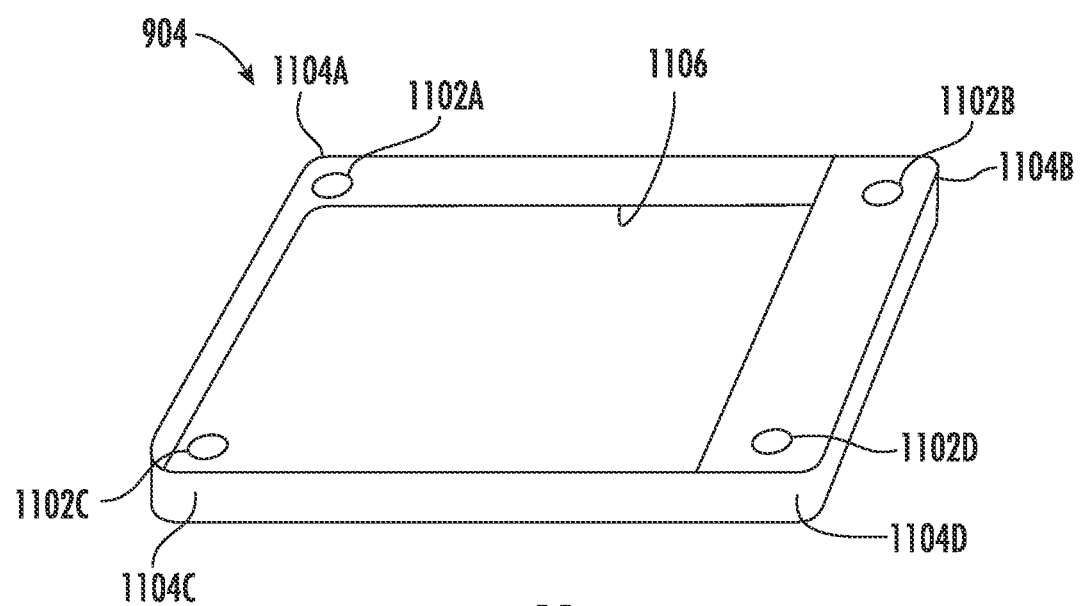
FIG. 11 illustrates a perspective view of a fourth cover of the casing apparatus, according to one or more embodiments described herein.

FIG. 11 illustrates a perspective view of the fourth cover 904 of the casing apparatus 900, according to one or more embodiments described herein. In an example embodiment, similar to the second cover 120 of the housing 106, the fourth cover 904 defines one or more through holes 1102a, 1102b, 1102c, and 1102d proximate to the plurality of corners 1104a, 1104b, 1104c, and 1104d of the fourth cover 904, respectively. In some examples, the fourth cover 904 may couple to the third cover 902 by means of screw passing through the one or more through holes 1102a, 1102b, 1102c, and 1102d and the one or more corresponding screw bosses 1006a, 1006b, 1006c, and 1006d. Further, the fourth cover 904 may define a void 1106 that may align with the depression 1012, in the third cover 902, in an instance in which the fourth cover 904 couples with the third cover 902. In some examples, the void 1106 may facilitate reception of the device 102 within the depression 1012.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A housing for a device comprising:
    a screw boss that extends outwardly from a first base plate of the housing, wherein the screw boss is proximate to a corner of the housing, the housing comprising a plurality of wall portions defining the corner;
    at least one rib directly connecting the screw boss to at least one wall portion of the plurality of wall portions,
    wherein at least the screw boss, the first base plate, the at least one rib, and the at least one wall portion of the plurality of wall portions are molded together to form a single portion of the housing;
    a central portion sized to detachably attach around the screw boss, wherein an inner surface of the central portion abuts an outer surface of the screw boss;
    a plurality of arms each attached to the central portion, the plurality of arms comprising at least two arms attached to two different wall portions of the plurality of wall portions; and
    a first wall latch and a second wall latch extending out from the two different wall portions, respectively, wherein the first wall latch comprises a first base portion and a first rod portion proximal to the first base portion and the second wall latch comprises a second base portion and a second rod portion proximal to the second base portion, and wherein one or more of the plurality of arms are attached around the first rod portion of at least one of the first wall latch and around the second rod portion of the second wall latch.

2. The housing according to claim 1, wherein the central portion and the plurality of arms form a force dissipation member that dissipates a force received at the corner along the plurality of arms and to the two different wall portions of the housing.

3. The housing according to claim 1, wherein the plurality of arms define a plurality of axes along which force received at the corner is distributed.

4. The housing according to claim 1, the housing further comprising:
    at least one supporting member attached to the screw boss and the first base plate.

5. The housing according to claim 1, the housing further comprising:
    at least one rib attached to the screw boss and at least one wall portion of the plurality of wall portions; and
    at least one supporting member attached to the screw boss and the at least one rib.

6. The housing according to claim 1, the housing further comprising:
    a first wall latch attached to a first wall portion of the two different wall portions, the first wall latch further attached a first arm of the at least two arms; and
    a second wall latch attached to a second wall portion of the two different wall portions, the second wall latch further attached to a second arm of the at least two arms,
    wherein the first wall latch is perpendicular to the first wall portion and the second wall latch is perpendicular to the second wall portion.

7. The housing according to claim 1, wherein the plurality of wall portions comprises a first external wall and a second external wall.

8. The housing according to claim 1, the housing further comprising:
    at least one supporting member attached to the screw boss and the first base plate, wherein the at least one supporting member is attached to the screw boss diagonally opposite the corner.

9. The housing according to claim 1, the housing further comprising:
    at least one supporting member attached to the screw boss and a first cover of the housing, wherein the at least one supporting member prevents the screw boss from bending.

10. The housing according to claim 1, wherein the screw boss is attached to the central portion using coupling means.

11. The housing according to claim 1, wherein the housing defines at least one additional corner, each additional corner of the at least one additional corner associated with an additional force dissipation member.

12. The housing according to claim 1, wherein the housing comprises a plurality of covers.

13. The housing according to claim 1, wherein the plurality of wall portions defining the corner comprises a first exterior wall perpendicular to a second exterior wall.

14. A system comprising:
    a housing comprising:
        a screw boss that extends outwardly from a first base plate of the housing, wherein the screw boss is proximate to a corner of the housing, the housing comprising a plurality of wall portions defining the corner;
        at least one rib directly connecting the screw boss to at least one wall portion of the plurality of wall portions,
        wherein at least the screw boss, the first base plate, the at least one rib, and the at least one wall portion of the plurality of wall portions are molded together to form a single portion of the housing;
        a central portion sized to detachably attach around the screw boss, wherein an inner surface of the central portion abuts an outer surface of the screw boss;
        a plurality of arms each attached to the central portion, the plurality of arms comprising at least two arms attached to two different wall portions of the plurality of wall portions; and
        a first wall latch and a second wall latch extending out from the two different wall portions, respectively, the first wall latch comprises a first base portion and a first rod portion proximal to the first base portion and the second wall latch comprises a second base portion and a second rod portion proximal to the second base portion, and wherein one or more of the plurality of arms are attached around the first rod portion of at least one of the first wall latch and around the second rod portion of the second wall latch; and circuitry configured to perform at least one operation.

15. The system of claim 14, wherein the system comprises a mobile device, a barcode scanner, an imager, or a dimensioner.

16. The system according to claim 14, wherein the screw boss, the central portion, and the plurality of arms form a force dissipation member that dissipates a force received at the corner along the plurality of arms and to the two different wall portions of the housing.

17. The system according to claim 14, wherein a first arm of the at least two arms is attached along a first axis and a second arm of the at least two arms is attached along a second axis.

18. A method comprising:
receiving a force acting on a corner of a device, the device comprising a housing and a force dissipation member of the device, wherein the housing comprises a plurality of wall portions;
transferring the force from the corner of the device to the force dissipation member of the device, the force dissipation member comprising a screw boss attached to a base plate of the housing, wherein the screw boss is molded together with at least the base plate to form a single portion of the housing, wherein the screw boss is proximate to the corner of the device; and
redirecting the force from the force dissipation member along a plurality of arms to the plurality of wall portions, the plurality of arms comprising at least two arms that each redirect at least a portion of the force to two different wall portions of the plurality of wall portions, wherein the plurality of arms are attached to a central portion attached around to the screw boss, and wherein one or more of the plurality of arms are attached around a first rod portion of at least one of a first wall latch and around a second rod portion of a second wall latch extending out from the two different wall portions, respectively.

19. The method according to claim 18, wherein the force is transferred from the corner of the device to the force dissipation member along one or more ribs attached to the force dissipation member, the one or more ribs directly connecting the screw boss to at least one wall portion of the plurality of wall portions, and wherein the one or more ribs are molded together with the base plate, the screw boss, and the at least one wall portion of the plurality of wall portions to form the single portion of the housing.

20. The method according to claim 18, wherein a first arm of the at least two arms redirects at least a first portion of the force along a first axis and a second arm of the at least two arms redirects at least a second portion of the force along a second axis.

* * * * *